2 Sheets—Sheet 1

B. G. DEVOE & W. L. WALKER.

Iron Fence.

No. 8,836. Reissued Aug. 5, 1879.

WITNESSES

E. F. Nottingham

A. M. Bright

INVENTORS.

B. G. Devoe, and W. L. Walker,

By Leggett & Leggett. ATTORNEYS.

N. PETERS, PHOTO-LITHOGRAPHER, WASHINGTON, D. C.

B. G. DEVOE & W. L. WALKER.

Iron Fence.

No. 8,836. Reissued Aug. 5, 1879.

WITNESSES
E. F. Nottingham
A. M. Bright.

INVENTORS.
B. G. Devoe.
W. L. Walker.
By Sayrett & Sayrett. ATTORNEYS

N. PETERS, PHOTO-LITHOGRAPHER, WASHINGTON, D. C.

UNITED STATES PATENT OFFICE.

BENJAMIN G. DEVOE AND WILLIAM L. WALKER, OF KENTON, OHIO, ASSIGNORS, BY MESNE ASSIGNMENTS, TO CHAMPION IRON FENCE COMPANY.

IMPROVEMENT IN IRON FENCES.

Specification forming part of Letters Patent No. 158,047, dated December 22, 1874; Reissue No. 8,836, dated August 5, 1879; application filed February 10, 1879.

*To all whom it may concern:*

Be it known that we, BENJAMIN G. DEVOE and WILLIAM L. WALKER, of Kenton, in the county of Hardin and State of Ohio, have invented certain new and useful Improvements in Iron Fences, of which the following is a specification.

Our invention relates to iron fences; and it consists, first, in a peculiar construction of the pickets and of the ornaments attached to the pickets, and such combination thereof with clamps and with the rails as will admit of such movement and automatic adjustment between the parts constituting our fence as will enable it readily to adapt itself to any grade or inequality of grade-surface without strain or distortion; second, in certain devices hereinafter specified for uniting, supporting, and adjusting iron fences; third, in a peculiar clip or binding-piece for uniting the pickets and the ornaments attached thereto with the rails, and at the same time, without displacement or strain, permit the parts that it embraces or unites to move in such a manner as to adjust themselves properly to any grade upon which the fence may be built.

Figure 1:
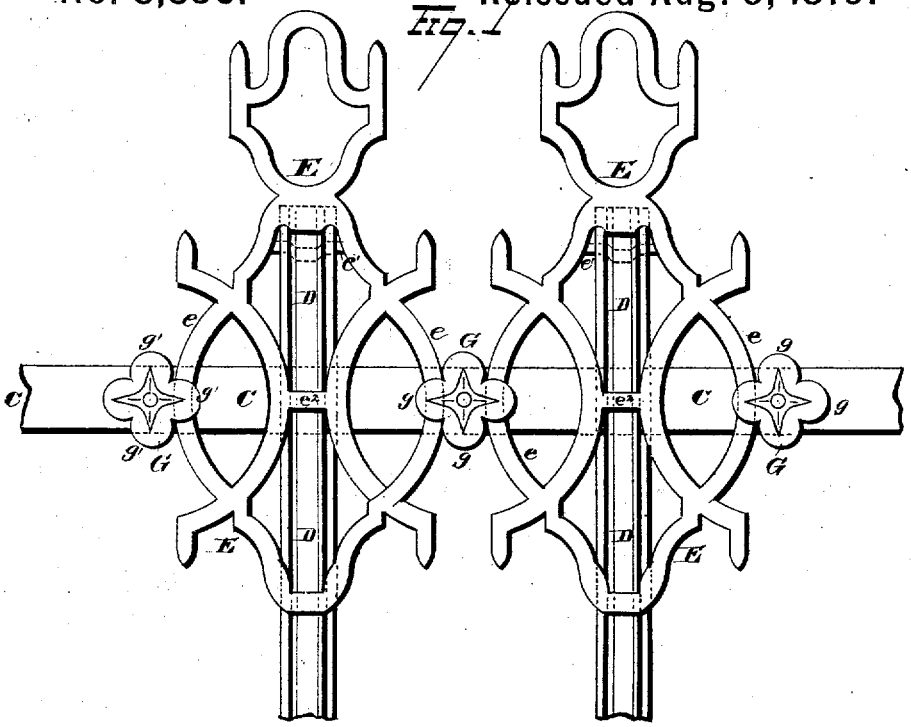
Figure 2:
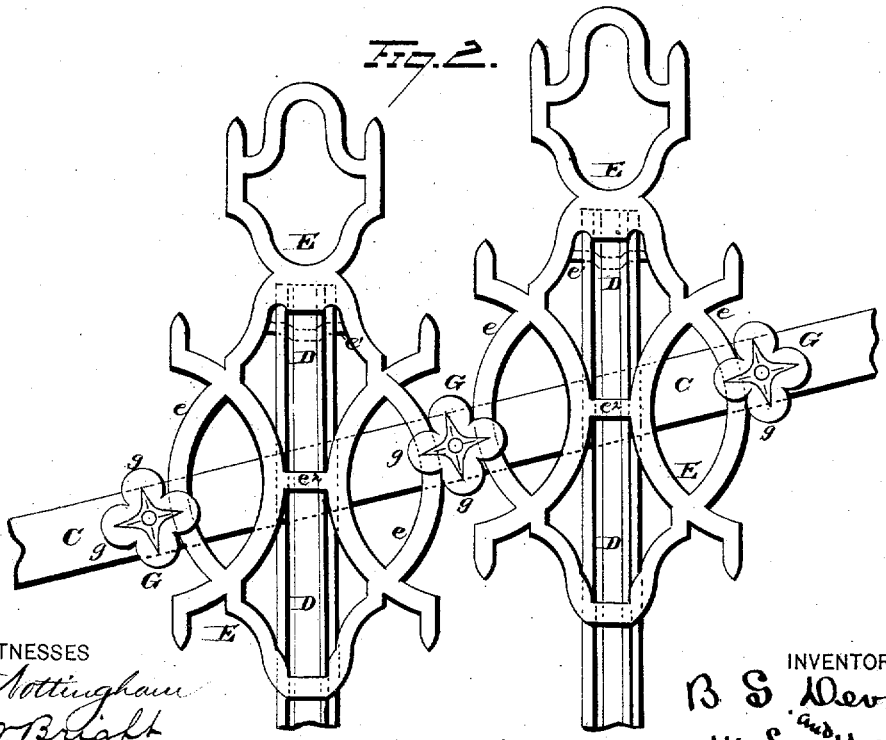
Figure 3:
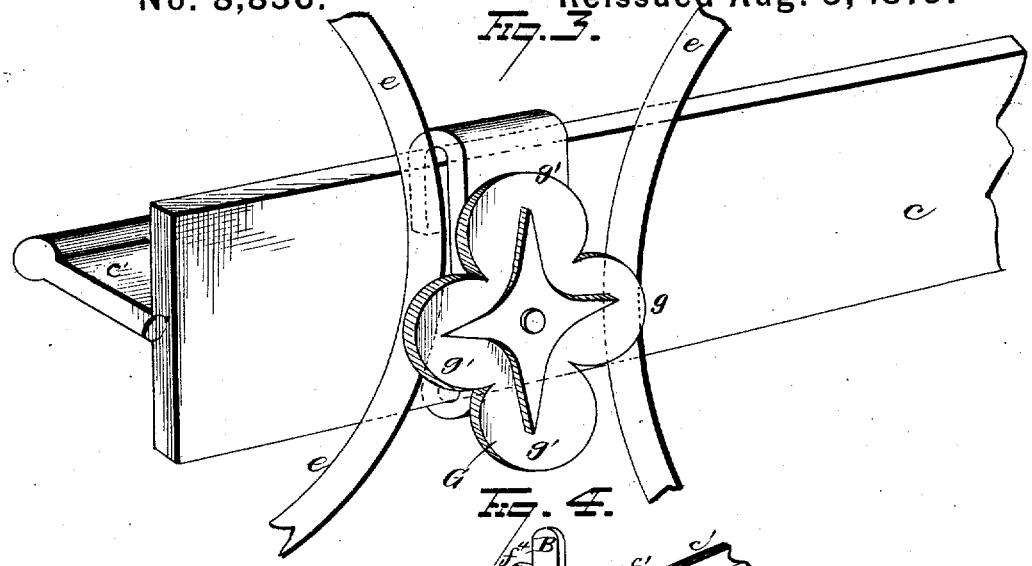
Figure 4:
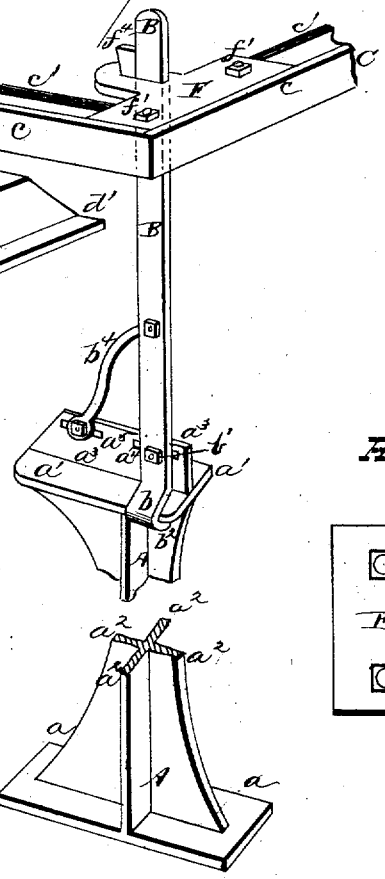
Figure 8:
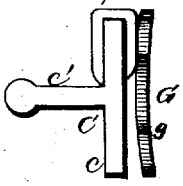
Figure 5:
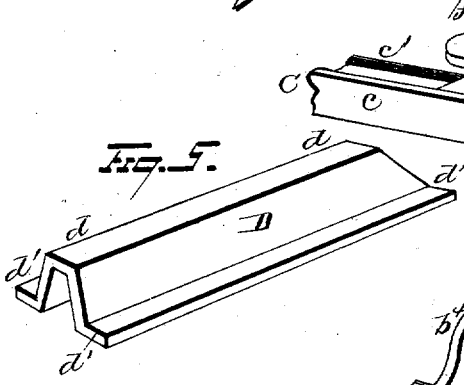
Figure 6:
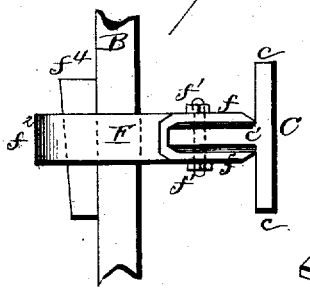
Figure 7:
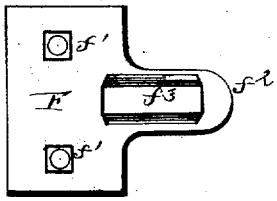

In the drawings, Figure 1 is a front view on a level, and Fig. 2 a similar view on an incline, of a part of a fence embodying our improvements; Fig. 3, a perspective view of the T or cross rail, showing the attachment of ornamental parts by means of the ornamental clamp; Fig. 4, a perspective view of base, with an upright and T-rails attached. Fig. 5 is a perspective view of the pickets; and Figs. 6, 7, and 8 are detail views of parts of the fence.

A is the base, cast in one piece and provided with a base-plate, $a$, and a top plate, $a^1$, and strengthening-ribs $a^2$, as shown in section, Fig. 4. This portion, up to the top plate, $a^1$, is under ground, and the top plate $a^1$ rests on the surface of the ground. The top plate, $a^1$, has an upright plate, $a^3$, formed thereon, and forms an inverted T. This plate $a^3$ is provided with two longitudinal slots, $a^4$ $a^5$.

The upright or post B is secured to this top plate by means of a bolt and nut or set-screw, $b^1$, passing through the post B and the slot $a^4$ in the plate $a^3$. The lower portion of the post or upright B has a projection or flange, $b$, formed at right angles to such post B, and of the same length as the width between the plate $a^3$ and the edge of plate $a^1$; and the outer end of this projection is bent round and projects under the plate $a^1$, thus forming a clamp, as shown at $b^2$, Fig. 4; and this clamp serves to hold the upright or post B firmly in position.

The post or upright B is further secured by means of a brace, $b^4$, one end of which is fastened to the plate $a^3$ by a bolt or set-screw passing through such brace $b^4$ and the longitudinal slot $a^5$, and the other end is fastened to the post B by a similar bolt or set-screw, as shown by Fig. 4.

The brace $b^4$ and the longitudinal slots $a^4$ $a^5$ serve to adjust the fence and keep it in line by moving the post and brace either backward or forward, as may be required, thereby obviating the moving or adjusting of the base, always attended with much labor and annoyance. C is the cross or horizontal rail, rolled in the shape of a letter T. To the vertical front or face plate, $c$, the pickets D and ornamental portions E are secured, as more fully explained hereinafter.

The back plate, $c'$, has its rear edge formed round and enlarged, somewhat like a railroad-rail, as shown by Fig. 3, so as to give it additional strength and rigidity.

F is a clamp or clip, by means of which two cross or horizontal T-rails, C, are clamped together when it is required to run the fence at right angles or join two sections of T-rails. This clamp is provided with projections $f$ $f$, forming jaws, between which the back plate, $c'$, of the T-rail C is firmly secured by means of bolts or set-screws $f^1$. (See Figs. 4, 6, and 7.) The shank or projection $f^2$ of the clamp or clip F has a longitudinal slot, $f^3$, formed therein for the passage of the upright or post B and the wedge or key $f^4$, by means of which the horizontal T-rails C are keyed securely to such upright B. The slot $f^3$ in the shank $f^2$ of the clamp or clip F has its sides formed round, so as to allow the T-rails to be inclined either way in order to adjust them to any grade.

By these means the horizontal T-rails C are made adjustable on the post B, (see Figs. 4, 6, and 7,) and, instead of the wedge or key $f^4$, set-screws may be used, if desired.

The pickets D are retained in proper vertical position and parallel relation with one another by means of the ornamental portions E and clamp or clip G, as illustrated in Figs. 1, 2, and 3 of the drawings.

We come now to speak of the two most important features of our invention—to wit, the parts E and clips G. The ornamental parts E are so constructed that their side arms or portions *e* form circles or segments of circles, and are provided on their rear faces with loops $e^1$, of the same shape as the inner side of the pickets D, so that the ornamental parts may be slipped over such pickets D, as shown in Figs. 1 and 2. One or more of these loops may be formed on the rear faces of such ornamental parts above and below the horizontal T-rail, according to the height of the pickets and ornamental parts.

The clips G, fixed to the horizontal rail C, and which serve directly to unite the parts *e*, are so formed that, while performing the function just specified, they may permit of a rotary movement of any two parts E between any clip G by virtue of the circular feature just above alluded to.

Fig. 2 of the drawings illustrates a section of our fence as it would appear placed upon a steep grade. This adaptation between the parts of our device, while securing a firm and durable union of parts, permits of such movement between said parts as will allow the rails C taking any grade whatever without disturbing the vertical position and parallel relation of pickets D, and without causing any strain or distortion of any part of the structure.

The different segments of circles are connected together by braces or cross-pieces $e^2$, fitting over the outside of the pickets D, by forming such braces of the shape of the outside of such pickets. The ornamental parts E and pickets D are held in position and firmly secured to the horizontal T-rails C by means of ornamental clamps G, the lateral sides *g* of which also form circles or segments of circles to correspond with the circles or segments of circles of the ornamental parts E, though other forms may be employed. The upper and lower portions, *g'*, of the clamps G are provided with lugs or projections bent round in such manner as to fit over and clasp the vertical face *c* of the horizontal T-rail C, Figs. 3 and 8, and by means of these clamps the pickets D and ornamental parts E are securely held in position on the horizontal T-rails C, the arms or segments *e* of the ornamental parts E being held by the lateral segmental sides *g* of the clamps G, such clamps being slipped on the rail C from the end of such rail.

By forming the arms or sides *e* of the ornamental parts E and ornamental clamps G of circles or segments of circles the fence may be adjusted to any level, as the pickets D and ornamental parts E can be inclined either to right or left, according to the radius of the segments, as plainly shown by Fig. 2.

The pickets D and rails C may be made of rolled iron, and the ornamental clamps G may be made of stamped wrought-iron or malleable iron, and the plate $a^3$ may be cast in one piece with the base A, as described; or such plate $a^3$ may be of wrought-iron, riveted or otherwise affixed to the base A.

Having thus described our invention, what we claim is—

1. A fence-picket the ornamental top of which is provided with one or more lateral circular adjusting-faces, *e*, substantially as and for the purposes specified.

2. A fence-picket the ornamental top of which has one or more lateral circular adjusting-faces, *e*, in combination with a clip or clamp, G, and a rail, C, substantially as and for the purpose specified.

3. The curved clip or clamp G, adapted, while sufficiently uniting the pickets with the rails of a fence, to permit of such a movement between said pickets and rails as will allow the pickets to assume a vertical position and parallel relation with each other, while the rails shall adapt themselves to any grade, substantially as and for the purposes shown.

4. The combination of the fence-picket D and top E, said top E provided with loops *e'*, substantially as and for the purpose shown.

5. A fence-picket, D, the ornamental top of which has a curved lateral arm or bearing, *e*, in combination with a rail, C, and a clamping device connecting said lateral arm or bearing with said rail, substantially as shown, whereby the same fence structure may be adapted to stand either upon a level surface or upon different or irregular grades, substantially as shown.

6. A fence-post, B, in combination with a rail having a slotted projection, $f^3$, adapted to permit of the passage through it (the said slotted portion) of said post B, either at a right angle or at an incline thereto, whereby, the post standing upright, the rail C may proceed from it either horizontally or at an angle or incline required for any grade upon which the fence may stand, substantially as shown.

7. In a fence, the combination, with a picket, of an independent top having a horizontal or transverse loop formed on the central upper portion of its rear face, said loop adapted to permit said picket to have a free longitudinal movement therein, substantially as specified.

BENJAMIN G. DEVOE.
WILLIAM L. WALKER.

In presence of—
HENRY PRICE,
GEO. P. ROSE.